United States Patent Office 3,547,937
Patented Dec. 15, 1970

3,547,937
CERTAIN 4-THIAZOLECARBOXAMIDINES
Guy D. Diana, Stephentown, N.Y., assignor to Sterling Drug Inc., New York, N.Y., a corporation of Delaware
No Drawing. Filed Mar. 7, 1968, Ser. No. 711,192
Int. Cl. C07d 91/32
U.S. Cl. 260—302                               2 Claims

ABSTRACT OF THE DISCLOSURE

This invention relates to carbimidoyl ureas which are prepared by reacting the appropriate isocyanates with the appropriate amidines. The compounds possess anthelmintic activity.

---

This invention relates to novel carbimidoyl ureas, to their preparation, and to intermediates therefore.

In one aspect of the invention there is provided carbimidoylureas of the formula $$R-\overset{N-R'}{\underset{\|}{C}}-NH\overset{O}{\underset{\|}{C}}-NHR''$$

where R is phenyl, benzyl, thiazolyl represented by the formula

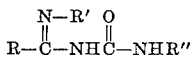

where Q, which stands for two substituents, is selected from the group consisting of hydrogen, lower-alkyl, phenyl, and halo; or thienyl represented by the formula

where Q', which stands for three substituents is selected from the group consisting of hydrogen, lower-alkyl, lower-alkoxy, halo, and nitro; R' is hydrogen or lower-alkyl, and R'' is halophenyl.

It will be understood that in the compounds represented by Formula I where R is thiazolyl, the connecting linkage from the carbimidoyl carbon atom can be attached to any one of the available carbon atoms of the thiazole ring and the substituents represented by Q can be the same or different and are attached to the two remaining carbon atoms of the thiazole ring.

It will be understood that in the compounds represented by Formula I where R is thienyl, the connecting linkage from the carbimidoyl carbon atom can be attached to any one of the available carbon atoms of the thiophene ring and the substituents represented by Q' can be the same or different and are attached to the three remaining carbon atoms of the thiophene ring.

In another aspect of this invention there is provided novel thiazolecarboxamidines of the formula

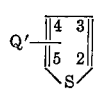

and their acid addition-salts where Q and R' have the meaning hereinbefore defined for Q and R' of Formula I.

It will be understood that in the compounds of Formula II, the connecting linkage from the carboxamidine carbon atom can be attached to any one of the available carbon atoms of the thiazole ring.

The carbimidoylureas of Formula I exist in tautomeric forms as illustrated by

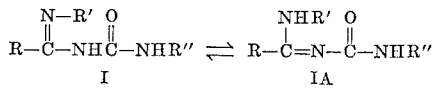

In like manner the thiazolecarboxamidines of Formula II exist in tautomeric forms as illustrated by

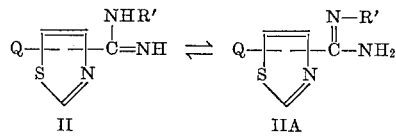

As with all tautomeric systems, the rate of transformation I⇌IA and the ratio I/IA and the rate of transformation II⇌IIA and the ratio II/IIA are dependent on the thermodynamic environment, including the state of aggregation, so that measurements by any particular technique do not necessarily have validity except under the conditions of the measurement, thereby, among other consequences, giving rise to problems for any simple designation of the physical embodiments. Thus, measurement of the infrared spectra in potassium bromide admixture and measurement of the nuclear magnetic spectra are not helpful in determining which tautomeric form, I or IA, or which tautomeric form II or IIA is present or predominates and therefore the names based on structure I and structure II are preferred although it is understood that either or both structures I and IA are either or both structures II and IIA are comprehended.

As used throughout this specification the terms "lower-alkyl" and "lower-alkoxy" each mean a group preferably containing from one to six carbon atoms which can be arranged in a straight or branched chain as illustrated, without limiting the generality of the foregoing, by methyl, ethyl, propyl, isopropyl, butyl, sec-butyl, pentyl or hexyl for lower-alkyl, and methoxy, ethoxy, isopropoxy or hexyloxy for lower-alkoxy.

The compounds of this invention represented by Formula I, are prepared by reacting an amidine of the formula

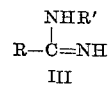

wherein R and R' have the meaning hereinbefore defined for R and R' of Formula I, with an isocyanate of the formula $$R''-N=C=O$$
IV wherein R'' has the meaning defined for R'' of Formula I in a suitable solvent, that is, a solvent which is essentially inert under the conditions of the reaction.

The exothermic reaction can be carried out at temperatures ranging from about 0° C. to about 80° C. However, the resulting desired compounds of Formula I, where R' is hydrogen, can react further with unreacted isocyanate, represented by Formula IV, especially at elevated temperatures, to form undesired side products. In order to prevent or minimize such further reaction, the reaction is preferably carried out initially at temperatures below room temperature using approximately equimolar amounts of the appropriate amidine and isocyanate.

The reaction is preferably carried out by reacting an amidine of the Formula III with an equivalent amount of an isocyanate of the Formula IV in a non-hydroxylic solvent, for example, acetone or benzene, at temperatures ranging from about 5° C. to about 15° C., for about one-half hour, and then allowing the temperature of the reaction mixture to rise to room temperature. The reaction is usually complete after about one hour.

The amidine, in its free base form, employed as starting material in the above described process is prepared from its corresponding salt, e.g. the hydrochloride, by reacting this salt with a stoichiometric amount of an appropriate base in a suitable solvent, for example, triethylamine in acetone, sodium acetonide in acetone, or sodium methoxide in benzene. It is preferred to use the resulting solution of the amidine directly in the next step but the amidine can be isolated by conventional techniques before use.

Amidine salts belong to a generally known class of compounds and can be readily prepared from nitriles by methods well known in the art of chemistry. Thus, a desired amidine can be obtained by conversion of a nitrile of the formula

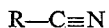

V where R has the meaning hereinbefore defined for R of Formula I to the salt of the corresponding imino-ether followed by treatment with an amine of the formula $R'$—$NH_2$

VI where R' has the meaning hereinbefore defined for R' of Formula I.

The following general procedures illustrate the methods that can be used for the preparation of the salt of the amidine of Formula III:

(a) Dry hydrogen chloride gas is passed through an ice-bath cooled solution of 2 moles of the intermediate nitrile in 100 ml. absolute ether and 2.1 moles of an appropriate alcohol (e.g. methyl or ethyl alcohol) until 2.6 moles is absorbed and the resulting solution is allowed to stand at about 5° C. for about 3 days. The resulting imino-ether hydrochloride is ground to a paste under absolute ethyl alcohol and added to a solution of 2.2 moles of the intermediate amine in 400 ml. absolute ethyl alcohol and the solution is stirred at room temperature for three hours and at about 5° C. for about sixteen hours during which time the amidine hydrochloride generally precipitates in crystalline form and can be isolated by filtration and used without further purification in the next step. Alternatively the amidine hydrochloride can be recrystallized from a suitable solvent before use.

(b) To a solution of 1 mole of the intermediate nitrile in 800 ml. dry methyl alcohol is added 1 mole sodium methoxide. The solution is left at room temperature for about eighteen hours after which 1 mole of the intermediate amine salt, e.g. the hydrochloride or sulfate, is added and the solution is stirred for about four hours and at about 5° C. for about sixteen hours during which time the amidine salt generally precipitates in crystalline form and can be isolated by filtration and can generally be used without further purification in the next step. Alternatively the amidine salt can be recrystallized from a suitable solvent before use.

Procedure (a) is preferred for the preparation of the hydrochlorides of the amidines of Formula III where R is phenyl or benzyl. Procedure (b) is preferred for the preparation of the salts of the amidines of Formula III where R is thiazolyl or thienyl.

The isocyanate of Formula IV employed as starting material in the hereinbefore described process belongs to a well-known class of compounds and can be readily prepared by standard procedures; for example, by condensing an amine of the formula

VII where R" has the meaning hereinbefore defined for R" of Formula I, with one equivalent of phosgene in a suitable solvent, for example toluene, and heating or distilling the resulting carbamyl chloride whereupon hydrogen chloride is eliminated and the resulting isocyanate can be isolated and purified by standard procedures.

Other well-known procedures that can be used for the preparation of the isocyanates of Formula IV are the Hoffmann, Curtius, or Lossen rearrangements of an appropriate acid of the formula

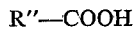

VIII where R" has the meaning hereinbefore defined for R" of Formula I.

Here and elsewhere, throughout this specification, it will be understood that the halophenyl ring of the carbimidoyl-ureas of Formula I, the halophenyl ring of the isocyanates of Formula IV, and the halophenyl ring of the amines of Formula VII can bear any kind and number of halo substituents at the available positions, and where there are a plurality of halo substituents, they can be the same or different and they can be in any of the various position combinations relative to each other.

As used throughout this specification, the term "halo" includes chloro, bromo, fluoro, and iodo.

The novel compounds of the instant invention are the compounds of Formula I and Formula II and the acid-addition salts thereof. The compounds of Formula I and Formula II in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible and are the full equivalents of each other.

It will thus be appreciated that Formula I and Formula II not only represent the structural configuration of the bases of Formula I and Formula II respectively, but are also representative of the structural entity which is common to all of my compounds of Formula I and Formula II respectively, whether in the form of the free bases or in the form of the acid-addition salts of the bases. I have found that by virtue of this common structural entity, the bases of Formula I and their acid-addition salts have inherent pharmacodynamic activity of a type more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this phamacodynamic activity of the salts of the compounds of Formula I, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, the salts of the compounds of Formula I and Formula II are useful as characterizing or identifying derivatives of the corresponding free bases or in isolation or purification procedures. Like all of the acid-addition salts, such characterizing or purification salt derivatives can, if desired, be used to regenerate the free bases by reaction of the salts with aqueous base, or alternatively can be converted to other acid-addition salts by, for example, ion-exchange procedures. Thus, by using such purification procedures the pharmaceutically-acceptable free bases of the compounds of Formula I, or alternatively their pharmaceutically-accepted acid-addition salts, can be prepared.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new carbimidoylureas of Formula I and the new thiazolecarboxamidines of Formula II and not in any particular acid moiety or acid anion associated with the salt forms of these compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly- carboxylic acids, such as found, for example, in Beilstein's Organische Chemic, 4th ed., Volumes III, IV, IX, X, XIV, XVII, XIX, XXI, XXII, and XXV; organic mono- and polysulfonic and -sulfinic acids, such as found for example in Beilstein Volumes VI, XI, XVI, and XXII; organic phosphonic and phosphinic acids, such as found, for example, in Beilstein Volumes XI and XVI; organic acids of arsenic and antimony, such as found, for example, in Beilstein Volume XVI; organic heterocyclic carboxylic, sulfonic, and sulfinic acids, such as found, for example, in Beilstein Volumes XVIII, XXII, and XXV; acidic ion-exchange resins; and inorganic acids of any acid forming element or combination of elements, such as found in Mellor, Comprehensive Treatise on Inorganic and Theoretical Chemistry, Longman's, Green and Co., New York, N.Y., Volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in Volume VI of Beilstein, acidic compounds having "activated" or acidic hydrogen atoms, as for example, picrolonic acid, or barbituric acid derivatives having an acidic proton, such as found, for example, in Cox et al., Medicinal Chemistry, Vol. IV, John Wiley and Sons, Inc., New York, N.Y. (1959). Also comprehended as salt-forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, tribuoroacetic acid, isobutyric acid, alpha-merchaptopropionic acid, malic acid, fumaric acid, oxalic acid, succinic acid, succinamic acid, glutamic acid, tartarc acid, citric acid, pamoic acid, lactic acid, glycolic acid, gluconic acid, saccharic acid, ascorbic acid, penicillin, benzoic acid, 4-methoxybenzoic acid, phthalic acid, salicylic acid, acetylsalyicylic acid, anthranilic acid, 1-naphthalenecarboxylic acid, cinnamic acid, cyclohexane-carboxylic acid, mandelic acid, tropic acid, crotonic acid, acetylene dicarboxylic acid, sorbic acid, pyromucic acid, cholic acid, pyrenecarboxylic acid, 2-pyridiencarboxylic acid, 3-indoleacetic acid, quinic acid, sulfamic acid, methanesulfonic acid, ethanesulfonic acid, benzenesulfinic acid, butylarsonic acid, diethylphosphinic acid, p-aminophenylarsinic acid, phenylstibnic acid, phenylphosphinous acid, methanephosphonic acid, phenylphosphinic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride and the like. The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of Formula I can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared.

The compounds of this invention have been tested in dogs by standard chemotherapeutic evaluation procedures described hereinbelow and were found to possess anthelmintic activity, in particular anti-hookworm activity. They are therefore useful as anthelmintic agents, in particular as anti-hookworm agents.

TEST PROCEDURE FOR THE DETERMINATION OF ANTHELMINTIC ACTIVITY

*Anti-hookworm activity.*—Both naturally infected and artificially infected mongrel dogs were used in the test. The naturally infected dogs carried a burden of two kinds of hookworm (*Uncinaria stenocephala* and *Anyclostoma caninum*). The artificially infected dogs were treated with sufficient hookworm (*Ancylostoma caninum*) larvae approximately one month prior to treatment with a test agent to insure that a mature infection would be present at the time of the test. Food was withheld from the dogs for a minimum of five hours prior to, and for three to five hours after each, administration of the test agent. Equal doses of the test agent were administered orally to form two to three dogs, infected naturally or artificially, one to two doses per dog per day from one to five consecutive days. The dogs were sacrificed five to eight days post-first medication and the intestines were searched for worms.

The carbimidoylureas of this invention were found to reduce or eliminate the hookworm burden from the infected dogs when administered in the dose range of from 85 to 125 mg./kg. (calculated on the basis of the free base). The number of doses administered ranged from one to two per day for from one to five consecutive days, depending on the severity of the helminth infection.

The actual determination of the numerical biological data definitive for a particular compound is readily determined by standard test procedures by technicians having ordinary skill in pharmacological test procedures, without the need for any extensive experimentation.

The molecular structures of the compounds of this invention were assigned on the basis of the method of their synthesis and study of their infrared spectra, and confirmed by the correspondence between calculated and found values for the elementary analysis for representative examples.

The following examples will further illustrate the invention without, however, limiting it thereto:

EXAMPLE 1

1-(4-chlorophenyl)-3-benzimidoylurea

To a stirred mixture, prepared by reacting 5.2 g. sodium with 300 ml. dry acetone, at room temperature was added 35 g. benzamidine hydrochloride in one portion and stirring was continued for thirty minutes. To the resulting mixture was added, dropwise, during one hour, 34.4 g. 4-chlorophenyl isocyanate, with stirring and external cooling in order to prevent the exothermic reaction from heating the mixture above room temperature. Stirring was continued at room temperature for eighteen hours and the mixture was concentrated to dryness under reduced pressure to give 1-(4-chlorophenyl)-3-benzimidoylurea. The free base was taken up in ether and the sodium chloride was removed by filtration. The filtrate was cooled to 0° C. and treated with etheral hydrogen chloride until acidic and the resulting solid was collected by filtration, washed with ether, and recrystallized from ethyl alcohol to yield 18.9 g. of the hydrochloride of 1-(4-chlorophenyl)-3-benzimidoylurea; M.P. 213–215° C.

EXAMPLE 2

1-(3,4-dichlorophenyl)-3-benzimidoylurea

Following a procedure similar to that described in Example 1 and using 2.3 g. sodium in 150 ml. dry acetone, 15.6 g. benzamidine hydrochloride, and 18.8 g. 3,4-dichlorophenyl isocyanate in 100 ml. dry acetone, there was obtained after recrystallization from ethyl alcohol 13.2 g. 1-(3,4-dichlorophenyl) - 3 - benzimidoylurea; M.P. 164–166° C.

Following a procedure similar to that described in Example 1 and substituting for 4-chlorophenyl isocyanate an equivalent amount of:

(a) pentachlorophenyl isocyanate
(b) 4-fluorophenyl isocyanate
(c) 2,4,6-triiodophenyl isocyanate
(d) 3,4,5-trichlorophenyl isocyanate
(e) 4-bromo-2,6-dichlorophenyl isocyanate
(f) 3-chloro-2,4,6-trifluoro isocyanate there can be obtained respectively:

(a) 1-(pentachlorophenyl)-3-benzimidoylurea
(b) 1-(4-fluorophenyl)-3-benzimidoylurea
(c) 1-(2,4,6-triiodophenyl)-3-benzimidoylurea
(d) 1-(3,4,5-trichlorophenyl)-3-benzimidoylurea
(e) 1-(4-bromo-2,6-dichlorophenyl)-3-benzimidoylurea
(f) 1-(3-chloro-2,4,6-trifluorophenyl)-3-benzimidolyurea The 4-bromo-2,6-dichlorophenyl isocyanate and 3-chloro-2,4,6-trifluorophenyl isocyanate listed above can be prepared by standard methods, hereinbefore described, from 4-bromo-2,6-dichloroaniline or 3-chloro-2,4,6-trifluoroaniline respectively, by reaction with phosgene and eliminating hydrogen chloride from the resulting N-arylcarbamyl chloride by heating it.

Following the general procedure hereinbefore described for the preparation of an amidine salt from a nitrile there can be prepared respectively from benzonitrile by converting it to its imino-ether hydrochloride and subsequent reaction of the imino-ether hydrochloride with the following:

(a) methylamine
(b) isopropylamine
(c) hexylamine the hydrochlorides of the following:

to (c) inclusive above, there can be obtained respectively the following:

(a) 1-(4-chlorophenyl)-3-(N-methylbenzimidoyl)urea
(b) 1-(4-chlorophenyl)-3-(N-isopropylbenzimidoyl)urea
(c) 1-(4-chlorophenyl-3-(N-hexylbenzimidoyl)urea

EXAMPLE 3

1-(3-chlorophenyl)-3-(phenylethanimidoyl)urea

To 150 ml. dry acetone was added 2.78 g. sodium in small portions with stirring and when addition was complete the mixture was heated under reflux for ten minutes, cooled to room temperature, and 20 g. phenylacetamidine hydrochloride was then added in one portion and stirring was continued for one hour. To this mixture was added a solution of 17.6 g. 3-chlorophenyl isocyanate in 150 ml. dry acetone, dropwise during one hour, with external cooling to prevent the reaction temperature from rising above room temperature, and stirring was continued for eighteen hours. The mixture was poured into one liter of water, chilled, and the resulting solid was collected by filtration and recrystallized from acetone to yield 2.4 g. 1-(3-chlorophenyl)-3-(phenylethanimidoyl) urea; M.P. 170.0–171.4° C.

Following a procedure similar to that described in Example 3 and substituting for 3-chlorophenyl isocyanate an equivalent amount of the following:

(a) pentachlorophenyl isocyanate
(b) 4-chlorophenyl isocyanate
(c) 4-fluorophenyl isocyanate
(d) 2,4,6-triiodophenyl isocyanate
(e) 3,4,5-triiodophenyl isocyanate
(f) 4-bromo-2,6-dichlorophenyl isocyanate
(g) 3-chloro-2,4,6-trifluorophenyl isocyanate there can be obtained respectively:

(a) 1-(pentachlorophenyl)-3-(phenylethanimidoyl)urea
(b) 1-(4-chlorophenyl)-3-phenylethanimidoyl)urea
(c) 1-(4-fluorophenyl)-3-(phenylethanimidoyl)urea
(d) 1-(2,4,6-triiodophenyl)-3-(phenylethanimidoyl)urea
(e) 1-(3,4,5-trichlorophenyl)-3-(phenylethanimidoyl) urea
(f) 1-(4-bromo-2,6-dichlorophenyl)-3-(phenylethanimidoyl)urea
(g) 1-(3-chloro-2,4,6-trifluorophenyl)-3-(phenylethanimidoyl)urea Following the general procedure hereinbefore described for the preparation of an amidine salt from a nitrile there can be prepared respectively from phenylacetonitrile by converting it to its imino-ether hydrochloride and subsequent reaction of the imino-ether hydrochloride with the following:

(a) methylamine
(b) isopropylamine
(c) hexylamine the hydrochlorides of the following:

(a) N-methyl(phenylacetamidine)
(b) N-isopropyl(phenylacetamidine)
(c) N-hexyl(phenylacetamidine)

Following a procedure similar to that described in Example 3 and substituting for phenylacetamidine hydrochloride an equivalent amount of the hydrochlorides of the phenylacetamidines listed from (a) to (c) inclusive above there can be obtained respectively the following:

EXAMPLE 4

1-(4-bromophenyl)-3-(2-methyl-4-thiazolecarbimidoyl)urea (A) To 200 ml. of dry acetone was added 2.29 g. sodium in portions with stirring and the mixture was stirred for thirty minutes. To this mixture, at room temperature, was added 17.7 g. of 2-methyl-4-thiazolecarboxamidine hydrochloride in one portion and after stirring for an additional thirty minutes there was added, dropwise during one hour, a solution of 19.7 g. 4-bromophenyl isocyanate in 200 ml. dry acetone while external cooling was applied to prevent the temperature of the reaction mixture from rising above room temperature. Stirring at room temperature was continued eighteen hours, the mixture was filtered, and the collected solids were slurried in water and the remaining solid was collected by filtration. The acetone filtrate was concentrated to dryness under reduced pressure, the residue was treated with 500 ml. ether, and the resulting solid was collected by decantation, combined with the solid obtained from the water slurry, and recrystallized from ethylene dichloride to give 23 g. 1-(4-bromophenyl)-3-(2-methyl - 4 - thiazolecarboximidoyl)urea; M.P. 185–186° C.

A solution of the free base in ether, chilled in an ice bath, can be treated with ethereal hydrogen chloride until acidic to give the hydrochloride of 1-(4-bromophenyl)-3-(2-methyl-4-thiazolecarbimidoyl)urea.

(B) The 2-methyl-4-thiazolecarboxamidine hydrochloride used above was prepared by the following method: A solution of 15.6 g. 2-methyl-4-cyanothiazole and 0.68 g. sodium methoxide in 100 ml. dry methyl alcohol was allowed to stand at room temperature for fifteen hours and 6.8 g. ammonium chloride was then added with stirring. The mixture was evaporated to dryness after four hours to give after recrystallization from isopropyl alcohol 17.7 g. 2-methyl-4-thiazolecarboxamidine hydrochloride; M.P. 149–151° C.

(C) The 2-methyl-4-cyanothiazole used above was prepared by the following method: A mixture of 37.29 g. 2-methyl-4-thiazolecarboxamide and 45.3 g. benzenesulfonyl chloride in 41.6 g. pyridine was heated to 65°. Heating was discontinued and the temperature of the exothermic reaction was maintained between 70 and 80° C. The solution was cooled to room temperature and the resulting mixture was taken up in ether and filtered. The filtrate was evaporated to dryness under reduced pressure and the residue was crystallized from ether to give 15 g. 2-methyl-4-cyanothiazole.

(D) The 2-methyl-4-thiazolecarboxamide used above was prepared by the following method: A mixture of 12 g. ethyl 2-methyl-4-thiazolecarboxylate and 24 ml. concentrated ammonium hydroxide was stirred at room temperature for twenty-four hours. The solid was collected by filtration, washed with water, and dried to give 7.6 g. 2-methyl-4-thiazolecarboxamide; M.P. 151–152° C.

(E) The ethyl 2-methyl-4-thiazolecarboxylate used above was prepared by the following method: To a stirred solution of 45.5 g. ethyl bromopyruvate in 300 ml. ether was added 20.84 g. thioacetamide in portions which maintained gentle reflux. The resulting mixture was heated under reflux for thirty minutes, the ether was evaporated, and the residue was heated at 110–115° C. for thirty minutes, and cooled to room temperature. Water was added and the mixture was treated with aqueous sodium bicarbonate solution until alkaline and extracted with ether. Evaporation to dryness yielded 20.8 g. ethyl 2-methyl-4-thiazolecarboxylate; M.P. 55–60° C.

(F) Thioacetamide can be prepared by treating a solution of acetamide in a solvent such as dry dioxane or dry tetrahydrofuran with powdered phosphorous pentasulfide at reflux temperatures for about fifteen to thirty minutes. The thioacetamide can be isolated and purified by standard techniques.

Following procedures similar to those described in Example 4 (C to F inclusive) and substituting for acetamide an equivalent amount of the following: heptanamide or 5-methylhexanamide there can be obtained in sequence the following: ethyl 2-hexyl-4-thiazolecarboxylate or ethyl 2-(4-methylpentyl)-4-thiazolecarboxylate respectively, 2-hexyl-4-thiazolecarboxamide or 2-(4-methylpentyl)-4-thiazolecarboxamide respectively, or 2-hexyl-4-cyanothiazole or 2-(4-methylpentyl)-4-cyanothiazole respectively.

Following a procedure similar to that described in Example 4B and substituting for 2-methyl-4-cyanothiazole an equivalent amount of the following:

(a) 2-hexyl-4-cyanothiazole
(b) 2-(4-methylpentyl)-4-cyanothiazole
(c) 2-phenyl-4-cyanothiazole
(d) 2-cyanothiazole
(e) 5-chloro-2-cyanothiazole
(f) 5-bromo-4-methyl-2-cyanothiazole
(g) 5-cyanothiazole there can be obtained respectively the hydrochlorides of:

(a) (2-hexyl-4-thiazole)carboxamidine
(b) [2-(4-methylpentyl)-4-thiazole]carboxamidine
(c) (2-phenyl-4-thiazole)carboxamidine
(d) 2-thiazolecarboxamidine
(e) (5-chloro-2-thiazole)carboxamidine
(f) (5-bromo-4-methyl-2-thiazole)carboxamidine
(g) 5-thiazolecarboxamidine Following a procedure similar to that described in Example 4A and substituting for 2-methyl-4-thiazolecarboxamidine hydrochloride an equivalent amount of the hydrochlorides of the thiazolecarboximidines listed from (a) to (g) inclusive above there can be obtained respectively:

(a) 1-(4-bromophenyl)-3-(2-hexyl-4-thiazolecarbimidoyl)urea
(b) 1-(4-bromophenyl)-3-(2-(4-methylpentyl)-4-thiazolecarbimidoyl)urea
(c) 1-(4-bromophenyl)-3-(2-phenyl-4-thiazolecarbimidoyl)urea
(d) 1-(4-bromophenyl)-3-(2-thiazolecarbimidoyl)urea
(e) 1-(4-bromophenyl)-3-(5-chloro-2-thiazolecarbimidoyl)urea
(f) 1-(4-bromophenyl)-3-(5-bromo-4-methyl-2-thiazolecarbimidoyl)urea
(g) 1-(4-bromophenyl)-3-(5-thiazolecarbimidoyl)urea Following a procedure similar to that described in Example 4A and substituting for 4-bromophenyl isocyanate an equivalent amount of the following:

(a) pentachlorophenyl isocyanate
(b) 4-fluorophenyl isocyanate
(c) 2,4,6-triiodophenyl isocyanate
(d) 3,4,5-trichlorophenyl isocyanate
(e) 4-bromo-2,6-dichlorophenyl isocyanate
(f) 3-chloro-2,4,6-trifluorophenyl isocyanate
(g) 4-chlorophenyl isocyanate there can be obtained respectively:

(a) 1-pentachlorophenyl-3-(2-methyl-4-thiazolecarbimidoyl)urea
(b) 1-(4-fluorophenyl)-3-(2-methyl-4-thiazolecarbimidoyl)urea
(c) 1-(2,4,6-triiodophenyl)-3-(2-methyl-4-thiazolecarbimidoyl)urea
(d) 1-(3,4,5-trichlorophenyl)-3-(2-methyl-4-thiazolecarbimidoyl)urea
(e) 1-(4-bromo-2,6-dichlorophenyl)-3-(2-methyl-4-thiazolecarbimidoyl)urea
(f) 1-(3-chloro-2,4,6-trifluorophenyl)-3-(2-methyl-4-thiazolecarbimidoyl)urea
(g) 1-4-chlorophenyl)-3-(2-methyl-4-thiazolecarbimidoyl)urea Following a procedure similar to that described in Example 4B and substituting for ammonium chloride an equivalent amount of the hydrochlorides of methylamine, isopropylamine, or hexylamine there can be obtained respectively the hydrochlorides of the following:

(a) 2-methyl-4-thiazole (N-methylcarboxamidine)
(b) 2-methyl-4-thiazole (N-isopropylcarboxamidine)
(c) 2-methyl-4-thiazole (N-hexylcarboxamidine)

Following a procedure similar to that described in Example 4A and substituting for 2-methyl-4-thiazolecarboxamidine hydrochloride an equivalent amount of the hydrochlorides of the following:

(a) 2-methyl-4-thiazole(N-methylcarboxamidine)
(b) 2-methyl-4-thiazole(N-isopropylcarboxamidine)
(c) 2-methyl-4-thiazole(N-hexylcarboxamidine)

there can be obtained respectively:

(a) 1-(4-bromophenyl)-3-[2-methyl-4-thiazole(N-methylcarbimidoyl)]urea
(b) 1-(4-bromophenyl)-3-[2-methyl-4-thiazole(N-isopropylcarbimidoyl)]urea
(c) 1-(4-bromophenyl)-3-[2-methyl-4-thiazole (N-hexyl-carbimidoyl)]urea.

EXAMPLE 5

1-(4-bromophenyl)-3-(4-thiazolecarbimidoyl)urea (A) Following a procedure similar to that described in Example 4A and using 6.94 g. sodium in 845 ml. dry acetone, 55 g. 4-thiazolecarboxamidine hydrochloride, and 56.5 g. 4-bromophenyl isocyanate in 300 ml. dry acetone, there was obtained after recrystallization from absolute methyl alcohol 57.4 g. 1-(4-bromophenyl)-3-(4-thiazolecarbimidoyl)urea; M.P. 191–197° C.

(B) The 4-thiazolecarboxamidine hydrochloride used above was prepared following a procedure similar to that described in Example 4B, but substituting 4-cyanothiazole for 2-methyl-4-cyanothiazole.

EXAMPLE 6

1-(4-chlorophenyl)-3-(3-thiophenecarbimidoyl)urea can be prepared as follows:

To 200 ml. of dry acetone is added 2.29 g. sodium in portions with stirring and the mixture is stirred for thirty minutes. To this mixture is added 16,27 g. of 3-thiophenecarboxamidine hydrochloride in one portion and stirring is continued for an additional thirty minutes after which a solution of 15.36 g. 4-chlorophenyl isocyanate in 200 ml. dry acetone is added while external cooling is applied to prevent the temperature of the reaction mixture from rising above room temperature. Stirring at room temperature is continued eighteen hours, the mixture is filtered, and the solids are slurried with water and filtered. The acetone filtrate is evaporated to dryness and the residue is combined with the solids remaining from the water slurry and is crystallized from a suitable solvent to give 1-(4-chlorophenyl)-3-(3-thiophenecarbimidoyl)-urea. A solution of the free base in ether, chilled in an ice bath, is treated with ethereal hydrogen chloride until acidic and the resulting salt is isolated and purified by standard techniques to give the hydrochloride of 1-(4-chlorophenyl)-3-(3-thiophenecarbimidoyl)urea.

Following the standard procedure described hereinbefore for the preparation of an amidine salt from a nitrile there can be obtained respectively from 3-thiophenecarbonitrile by converting it to its imino-ether and subsequent reaction of the imino-ether with the hydrochlorides of methylamine, isopropylamine, or hexylamine the hydrochlorides of:

(a) 3-thiophene(N-methylcarboxamidine)
(b) 3-thiophene(N-isopropylcarboxamidine)
(c) 3-thiophene(N-hexylcarboxamidine)

and from 2,5-dimethyl 3-thiophenecarbonitrile by converting it to its imino-ether and subsequent reaction of the imino-ether with ammonium chloride the hydrochloride of:

(d) 2,5-dimethyl-3-thiophenecarboxamidine.

Following a procedure similar to that described in Example 6 and substituting for 3-thiophenecarboxamidine hydrochloride an equivalent amount of the hydrochlorides of the following:

(a) 3-thiophene(N-methylcarboxamidine)
(b) 3-thiophene(N-isopropylcarboxamidine)
(c) 3-thiophene(N-hexylcarboxamidine)
(d) 2,5-dimethyl-3-thiophenecarboxamidine
(e) 5-methoxy-3-thiophenecarboxamidine
(f) 5-chloro-3-thiophenecarboxamidine
(g) 5-bromo-4-nitro-2-thiophenecarboxamidine
(h) 2-thiophenecarboxamidine there can be obtained respectively:

(a) 1-(4-chlorophenyl)-3-[3-thiophene(N-methylcarbimidoyl)]urea
(b) 1-(4-chlorophenyl)-3-[3-thiophene(N-isopropylcarbimidoyl)]urea
(c) 1-(4-chlorophenyl)-3-[3-thiophene(N-hexylcarbimidoyl)]urea
(d) 1-(4-chlorophenyl)-3-(2,5-dimethyl-3-thiophenecarbimidoyl)urea
(e) 1-(4-chlorophenyl)-3-(5-methoxy-3-thiophenecarbimidoyl)urea
(f) 1-(4-chlorophenyl)-3-(5-chloro-3-thiophenecarbimidoyl)urea
(g) 1-(4-chlorophenyl)-3-(5-bromo-4-nitro-2-thiophenecarbimidoyl)urea
(h) 1-(4-chlorophenyl)-2-(thiophenecarbimidoyl)urea.

Following a procedure similar to that described in Example 6 and substituting for 4-chlorophenyl isocyanate an equivalent amount of:

(a) pentachlorophenyl isocyanate
(b) 4-fluorophenyl isocyanate
(c) 2,4,6-triiodophenyl isocyanate
(d) 3,4,5-trichlorophenyl isocyanate
(e) 4-bromo-2,6-dichlorophenyl isocyanate
(f) 3-chloro-2,4,6-trifluorophenyl isocyanate
(g) 4-bromophenyl isocyanate there can be obtained respectively:

(a) 1-pentachlorophenyl-3-(3-thiophenecarbimidoyl)urea
(b) 4-fluorophenyl-3-(3-thiophenecarbimidoyl)urea
(c) 2,4,6-triiodophenyl-3-(3-thiophenecarbimidoyl)urea
(d) 3,4,5-trichlorophenyl-3-(3-thiophenecarbimidoyl)urea
(e) 4-bromo-2,6-dichlorophenyl-3-(3-thiophenecarbimidoyl)urea
(f) 3-chloro-2,4,6-trifluorophenyl-3-(3-thiophenecarbimidoyl)urea
(g) 4-bromophenyl-3-(3-thiophenecarbimidoyl)urea

I claim:
1. 4-thiazolecarboxamidine.
2. 2-methyl-4-thiazolecarboxamidine.

References Cited

FOREIGN PATENTS 1,487,304   5/1967   France _____ 260—302

ALEX MAZEL, Primary Examiner

R. J. GALLAGHER, Assistant Examiner

U.S. Cl. X.R.

260—239.1, 258, 295, 299, 300, 332.2, 553; 424—200, 232, 245, 270, 271, 275, 297, 322